United States Patent

[11] 3,595,375

| [72] | Inventors | Harold B. Kaufman, Jr.<br>New York;<br>Leonard G. Fischer, College Point, both of, N.Y. |
|---|---|---|
| [21] | Appl. No. | 872,541 |
| [22] | Filed | Oct. 30, 1969 |
| [45] | Patented | July 27, 1971 |
| [73] | Assignee | DCA Food Industries, Inc.<br>New York, N.Y. |

[54] MANUAL BATCH LOADER
9 Claims, 5 Drawing Figs.

[52] U.S. Cl. .................................................. 198/65,
198/209, 198/213
[51] Int. Cl. .................................................. B65g 29/00
[50] Field of Search .................................... 198/213,
65, 126, 209

[56] References Cited
UNITED STATES PATENTS

| 2,278,434 | 4/1942 | Fahey | 198/209 |
| 3,037,646 | 6/1962 | Petit | 214/16.4 |
| 3,329,254 | 7/1967 | De Pass | 198/213 X |

Primary Examiner—Gerald M. Forlenza
Assistant Examiner—Jerold M. Forsberg
Attorney—Amster and Rothstein

ABSTRACT: A manually loaded and automatically operable feeder for delivering units or products in succession to in-line continuous processing equipment which feeder includes a loading drum having a spiral shelf which receives thereon a manually loaded batch of units or products. The loading drum is rotated about its axis and displaced therealong to bring successive portions of its shelf past a predetermined unloading location at which the units or products are unloaded in succession.

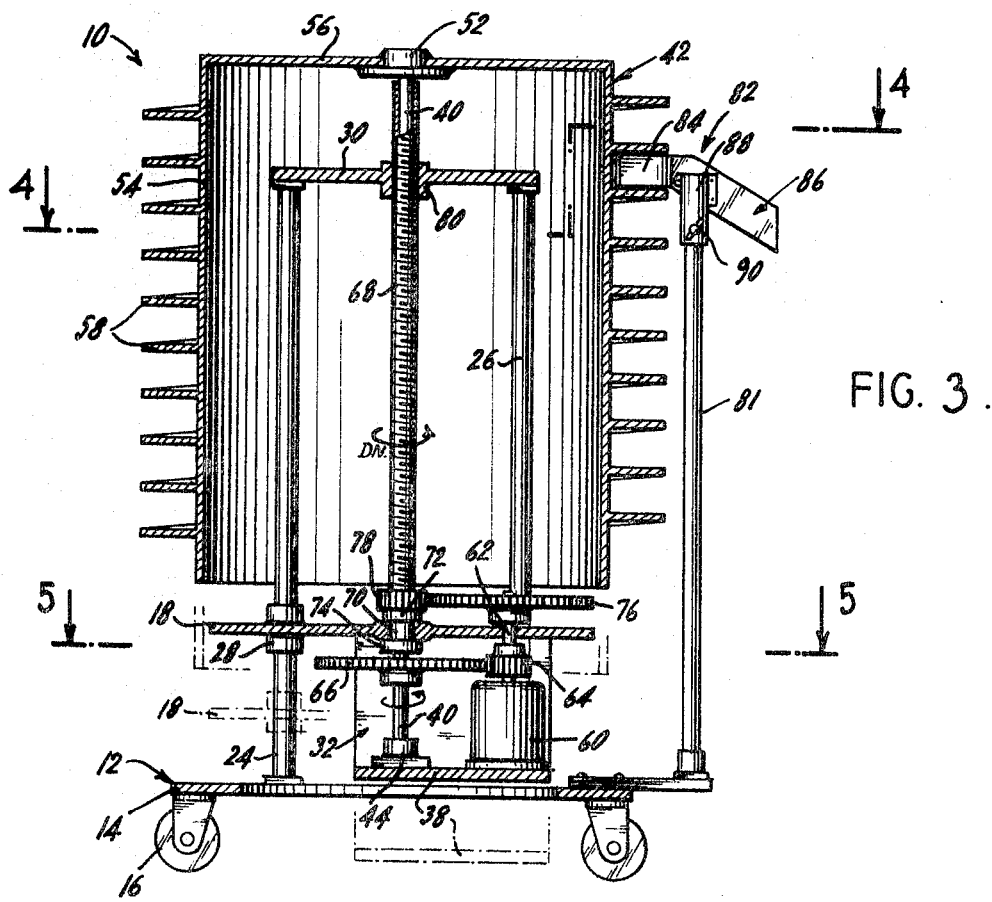
FIG. 3.
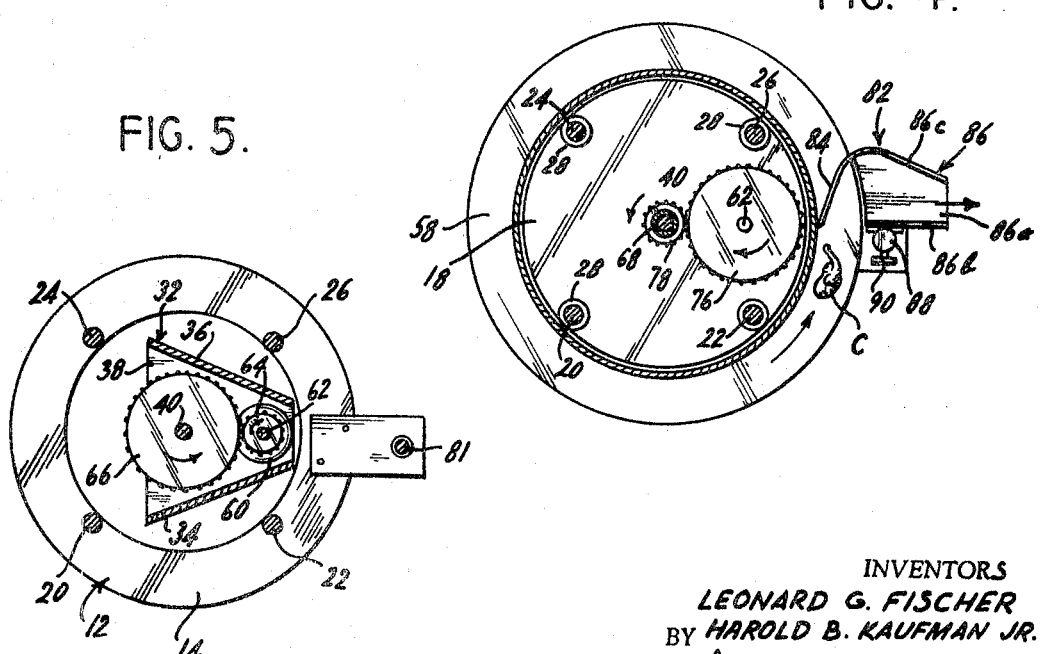
FIG. 4.
FIG. 5.
INVENTORS
LEONARD G. FISCHER
BY HAROLD B. KAUFMAN JR.
Amster + Rothstein
ATTORNEYS

PATENTED JUL 27 1971

INVENTORS
LEONARD G. FISCHER
HAROLD B. KAUFMAN JR.
BY
Amster & Rothstein
ATTORNEYS

MANUAL BATCH LOADER

The present invention relates to feeders, and in particular to a batch-loaded continuous feeder which is adapted to be manually loaded with a batch of products or units and is operable to automatically unload the products or units in succession at an unloading station or location.

In a wide variety of in-line continuous processes for handling large numbers of individual units, such as food products, there exists a need for equipment which may be batch-loaded and then placed into operation to feed the products or units in succession and in time relation to the in-line processing equipment. The provision of such batch-loaded continuous feeder permits an operator to load the feeder, place it into automatic operation and then attend to other aspects of the particular process or even unrelated duties. For example, in the mass preparation of breaded food products, such as chicken parts, various items of sea food including shrimps, scallops and the like, automatic equipment is available for breading such products. It becomes necessary to deliver the food products to the input of the breading machine at the rate at which the machine is capable of battering and breading the food products. Rather than have an operator in constant attendance at the input of the breading machine to hand deliver the food products one at a time and at the rate which the machine is capable of processing the food products, it would be quite advantageous if an operator could merely batch-load an entire feeder and then place the feeder into operation to deliver the food products in succession and at a predetermined feed rate to the breading machine.

Broadly, it is an object of the present invention to provide the feeder which realizes one or more of the aforesaid objectives. Specifically it is within the contemplation of the present invention to provide a batch-loaded feeder which is capable of delivering the batch-loaded products to further processing equipment in succession and at a predetermined and controllable feed rate.

It is a further object of the present invention to provide a batch-loaded, automatic and continuous feeder which is relatively easy to batch load and is of simple and rugged construction such that it may be employed over long periods of time with minimal requirement for servicing, repair or replacement of parts.

In accordance with an illustrative embodiment demonstrating objects and features of the present invention there is provided an automatic batch-loaded continuous feeder which comprises a support. A carrier is mounted on a support for vertical movement. Mounted on the carrier is a loading drum which is rotatable about a drum axis and displaceable along the drum axis. The loading drum has a circumferentially extending spiral shelf which is adapted to receive thereon a batch of units to be unloaded in succession. Drive means are provided on the carrier and operatively connected to the loading drum for rotating and displacing the loading drum to bring successive portions of the spiral shelf past a predetermined unloading location. Means are provided at the unloading location extending onto the shelf for causing the units to be unloaded in succession. Advantageously, the drive may be of a type which is capable of operating at one of a number of preset speeds or it may be of the variable speed type.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 3 is an enlarged vertical section through the feeder with certain parts now being shown in section and with the feeder being shown in an intermediate unloaded position, the dotted line showing the loaded position for the feeder illustrated completely in FIG. 2;

FIG. 4 is a sectional view taken substantially along the lines 4-4 of FIG. 3 and looking in the direction of the arrow; and FIG. 5 is a sectional view taken substantially along the line 5-5 of FIG. 3 and looking in the direction of the arrows.

Figure 1:
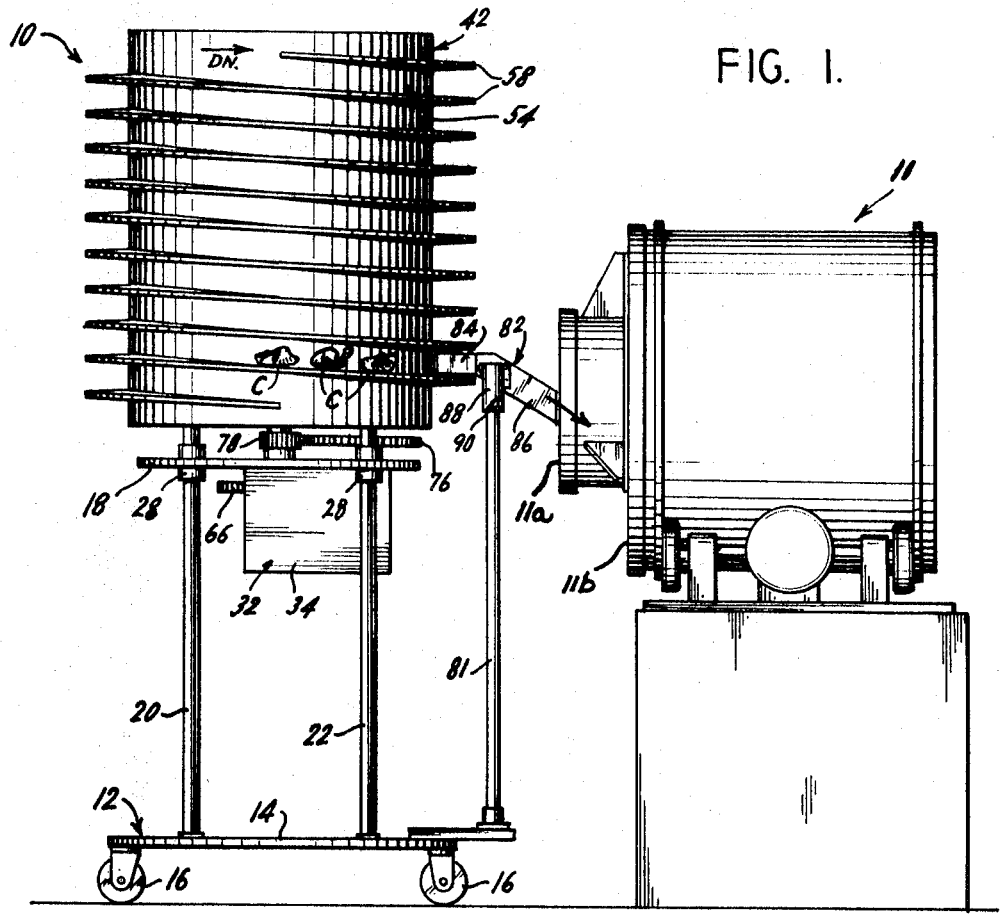
FIG. 1 is an elevational view of a batch-loaded continuous feeder shown in a substantially loaded position and feeding food products to an in-line continuous processing unit, such as a breading machine.

Referring now to the specific drawings, there is shown in FIG. 1 an automatic batch-loaded continuous feeder embodying features of the present invention and generally designated by the reference numeral 10. The feeder 10 is shown in a substantially loaded and elevated position and is illustrated as delivering chicken parts C to an in-line continuous breading machine, generally designated by the reference numeral 11. For a complete description of a typical institutional breading machine of the type generally illustrated in FIG. 1, reference may be made to application Ser. No. 822,946 of May 8, 1969, entitled "Method and Machine for Coating Food Products" which application is assigned to the assignee of the instant application. For the present purposes, it will suffice to understand that the breading machine 11 receives food products at inlet opening 11a disposed axially and centrally of the machine and discharges the food products at an outlet opening 11b disposed therebelow. Although a particular type of breading machine has been illustrated, it will be appreciated that the present invention finds useful application with various types of breading equipment and indeed may be employed to batch load a wide variety of food as well as manufactured hardware products, electrical parts, electronic components and the like.

Feeder 10 comprises a support 12 which is in the form of a rectangular baseplate 14 mounted at its corners on casters 16. Disposed above baseplate 14 is a vertically movable carrier 18 which is mounted on baseplate 14 by four upstanding mounting rods 20, 22, 24 and 26. The mounting rods extend through appropriate bearing sleeves on carrier 18, such as bearing sleeve 28. Bridging the upper ends of the mounting rods 20, 22, 24, and 26 is a crosshead 30 which is in the form of a circular plate.

Depending from carrier 18 is an underslung mounting frame 32 which is trapezoidal in cross section (see FIG. 5) and includes angularly disposed upstanding sides 34, 36 secured at their upper edges to the carrier 18 and carrying a horizontal bottom wall 38 at their lower ends. Projecting upwardly from bottom wall 38 of mounting frame 32 is a drum shaft 40 which drum shaft extends through carrier 18 and provides the central support for loading drum or turntable 42. Specifically, drum shaft 40 is journaled at its lower end on bottom wall 38 of mounting frame 32 by bearing 44, is journaled on carrier 18 by appropriate bearings and is rigidly connected to drum 42 at mounting cap 52. Drum shaft 40 serves as the axis of rotation for drum 42.

Drum 42 includes an upstanding cylindrical drum wall 54 which is open at its lower end such that it may receive mounting rods 20, 22, 24, 26, etc. and is closed at its upper end by top wall 56 to which mounting cap 52 is centrally secured. Projecting radially and outwardly of the upstanding cylindrical wall 54 is a circumferentially extending spiral shelf 58 onto which products may be loaded at circumferential locations and at the successive levels provided by the lands or turns of the shelf 58. The width and spacing of the successive lands or spirals of shelf 58 is determined by size of the products to be handled.

Rotation is imparted to loading drum or turntable 42 about the drum axis afforded by drum shaft 40 from motor 60 which is mounted on the bottom wall 38 of mounting frame 32, with its motor shaft 62 extending parallel to drum shaft 40 and through carrier 18. Motor 60 will be of the reversible, two-speed or variable speed type; and in the latter event, an appropriate variable speed control will be associated with the drive. Mounted on motor shaft 62 below carrier 18 is a drum drive gear 64 which meshes with larger diameter drum driven gear 66 keyed or otherwise secured to drum shaft 40.

Figure 2:
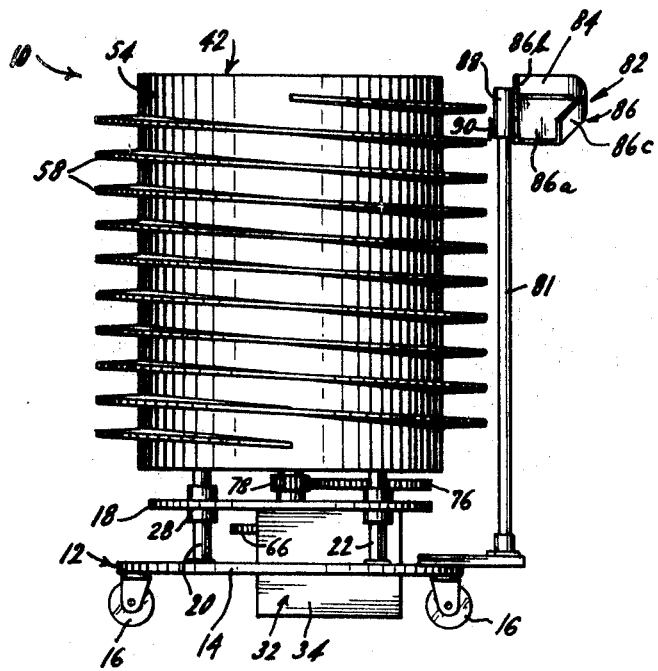
FIG. 2 is an elevational view showing the batch-loaded continuous feeder in its unloaded position and illustrating the unloading devices associated with the feeder in an inoperative position for purposes of clarity in illustration.

Intermediate the carrier 18 and mounting cap 52 an externally threaded lead screw 68 is mounted on about drum shaft 40. Lead screw 68 is journaled on the carrier 18 by a rigidly connected bearing sleeve 70 which is received in a corresponding bearing opening in carrier 18 and thrust collars 72, 74 which overlie and underlie corresponding central flats or bearing surfaces formed on carrier 18. It will be appreciated that drum shaft 40 is bearing mounted on carrier 18, since drum shaft 40 passes with a bearing fit through bearing sleeve 70. Lead screw 68 is coupled to the upper end of the motor shaft 62 by a lead screw drive gear 76 connected to motor shaft 62 and meshing with lead screw driven gear 78 keyed to lead screw 68 above thrust collar 72. In turn, lead screw 68 is in threaded engagement with a stationary lead nut 80 formed integrally with or connected to crosshead 30. Thus, in response to motor drive, depending upon the ratio or gearing 76, 78, and the pitch of lead screw 68, the loading drum 42 may be axially displaced from the unloaded position illustrated in FIG. 2 through the intermediate position illustrated in FIG. 3 and into the substantially loaded position illustrated in FIG. 1.

Provision is made at a predetermined unloading prelocation or station for causing successive products or units to be unloaded from the feeder 10 to the in-line processing equipment, such as the institutional breading machine 11. In this illustrative embodiment, the unloading device includes a standard 81 secured to the wheeled baseplate 14 and carrying a vertically adjustable unloading head 82. Unloading head 82 includes a doctor blade 84 (see FIGS. 1 and 3) which overlies the shelf 58 at the unloading location or station, substantially filling the space between successive turns or lands of the shelf 58. Doctor blade 84 directs products into exit chute 86 which includes a chute bottom 86a and upstanding sidewalls 86b, 86c. In this illustrative embodiment, doctor blade 84 curves into chute wall 86c (see FIG. 4) such that successive products brought to the unloading location are directed outwardly and into the exit chute whereupon they fall downwardly into the in-line processing equipment (see FIG. 1). The unloading device 84, 86 is mounted for vertical adjustment by the provision of mounting sleeve 88 which is slidably mounted on standard 81 and may be locked in any position of adjustment by locking member 90.

In order to facilitate a more thorough understanding of the present invention, a typical sequence of operations will now be described:

Initially, the manually loaded feeder is in the position illustrated in FIG. 1. The unloading device 82 is then brought into its operative position lying between selected lands of shelves 58 at the lowermost end of the drum 42, with the unloading chute 86 directed toward the in-line processing device, for example, the institutional breading machine illustrated in FIG. 1. Gearing 64, 66 and 76, 78, as well as the pitch of lead screw 68 are selected in accordance with the delivery requirements, or the speed of motor 60 may be controlled, to feed the individual units such as the chicken parts C, to the processing equipment. Once the feeder 10 is placed into operation, it rotates in the counterclockwise direction (when viewed from above), that is, from left to right in FIGS. 1 to 3 and the products C on the shelf 58 move into contact with the doctor or deflecting blade 84 whereupon they enter chute 86 and are directed to the processing equipment. At the end of the machine in travel, with the feeder 10 substantially unloaded, the doctor blade 84 may be swung to a clearance position relative to the drum 42 whereupon the feeder 10 may be manually loaded and returned to its feeding or loaded position shown in FIG. 1. It is within the contemplation of the invention to provide appropriate controls including limit switches for automatically terminating an unloading cycle when the drum reaches approximately the level corresponding to the unloaded position shown in FIG. 2 and to provide arrangement for the rapid raising of the drum of the feeder to the feeding or loaded position shown in FIG. 1. In a typical application, substantial time saving may be achieved by the use of the present feeder. For example, if chicken parts are to be discharged at the rate of 10 per minute to feed the institutional breading machine, representing a 6-second feeding interval, it is possible for the operator to load the feeder at a rate of approximately 120 parts per minute, or one-half second per part. This represents a ratio of loading time to unloading time of approximately 1 to 12. Thus, the operator would consume approximately 2 minutes to batch load the feeder, and then the feeder 10 could be placed into automatic operation for its unloading period of approximately 24 minutes. This would free the operator for a substantial period of time for other related or unrelated activities. In fact, the equipment could be left substantially unattended and an appropriate control and signalling device provided which would automatically discontinue machine operation and audibly or visibly signal the need for the next manual batch load.

Although the unloading head has been illustrated as a stationary one which is pivoted into and out of its operative position, it is also within the contemplation of the invention that the unloading head be of the fixed type which remains in its operative position during both manual loading and automatic feed. Also, the unloading head may take the form of a rotating blade which is motor driven or solenoid controlled to eject products in succession from the feed drum.

The device is of relatively simple construction and thereby lending itself to mass production manufacture at comparatively low unit cost, ease in servicing and cleaning and is capable of operation over long periods of time with minimum need for maintenance, repair and replacement of parts.

A latitude of modification, substitution and change is intended in the foregoing disclosure, and in some instances some features of the invention will be used without a corresponding use of other features. Accordingly, it is appropriate that the appended claims be construed broadly and in a manner consistent with the spirit and scope of the present invention.

What we claim is:

1. An automatic batch-loaded continuous feeder comprising a support, a carrier, means mounting said carrier on said support for vertical movement, a loading drum having a substantially vertical drum axis and including a circumferentially extending spiral shelf adapted to receive thereon a batch of units to be unloaded in succession, means on said carrier mounting said loading drum thereon for rotation about and displacement along said drum axis, drive means on said carrier operatively connected to said loading drum for rotating and displacing said loading drum to bring successive portions of said shelf past a predetermined unloading location and means at said unloading location extending onto said shelf for causing said units to be unloaded in succession.

2. A feeder according to claim 1 wherein said last named means includes a doctor blade overlying said shelf at said unloading location for directing successive units outwardly on said shelf and an exit chute arranged to receive the outwardly directed units.

3. A feeder according to claim 1 wherein the means mounting said carrier on said support includes plural upstanding mounting rods fixed to said support and bearing means on said carrier in sliding engagement with said mounting rods.

4. A feeder according to claim 1 wherein said drive means includes a drive motor, means including a drum shaft operatively connected to said motor and to said loading drum for rotating the same about said drum axis and further means including a lead screw and follower operatively connected to said drive motor and to said carrier for displacing said loading drum along said drum axis.

5. An automatic batch-loaded continuous feeder comprising a support, a loading drum having a substantially vertical drum axis and including a circumferential extending spiral shelf adapted to receive thereon a batch of units to be unloaded in succession, means on said support mounting said loading drum for rotation about and displacement along said drum axis and drive means operatively connected to said loading drum for rotating and displacing same to bring successive portions of said shelf past a predetermined unloading location, and means at said unloading location extending onto said shelf for causing said units to be unloaded in succession.

6. A feeder according to claim 5 including means at said unloading location extending onto said shelf for causing said units to be unloaded in succession.

7. A feeder according to claim 6 wherein the unloading means includes a doctor blade overlying said shelf at said unloading location for directing successive units outwardly on said shelf and an exit chute arranged to receive the outwardly directed units.

8. A feeder according to claim 7 wherein the means mounting said loading drum on said support includes a carrier, plural upstanding mounting rods fixed to said support and bearing means on said carrier in sliding engagement with said mounting rods.

9. A feeder according to claim 7 wherein said drive means includes a drive motor, means including a turntable shaft operatively connected to said drive motor and to said loading drum for rotating the same about said drum axis and further means including a lead screw and follower operatively connected to said drive motor and to said carrier for displacing said loading drum along said drum axis.